June 30, 1925.  
S. P. GRIFFIN  
CLUTCH  
Filed June 27, 1924    2 Sheets-Sheet 1  
1,544,447

Inventor:
S. P. GRIFFIN,
By Monroe E. Miller
Attorney.

June 30, 1925.                                              1,544,447
S. P. GRIFFIN
CLUTCH
Filed June 27, 1924        2 Sheets-Sheet 2

Inventor:
S. P. GRIFFIN,
By Monroe E. Miller
Attorney.

Patented June 30, 1925.

1,544,447

UNITED STATES PATENT OFFICE.

SAMUEL P. GRIFFIN, OF ORLANDO, FLORIDA.

CLUTCH.

Application filed June 27, 1924. Serial No. 722,754.

*To all whom it may concern:*

Be it known that I, SAMUEL P. GRIFFIN, a citizen of the United States, residing at Orlando, in the county of Orange and State of Florida, have invented certain new and useful Improvements in Clutches, of which the following is a specification, reference being had therein to the accompanying drawing.

The present invention relates to clutches, and has for its object the provision of novel and useful improvements in clutches using toggle devices for obtaining an effective connection of the clutch members.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
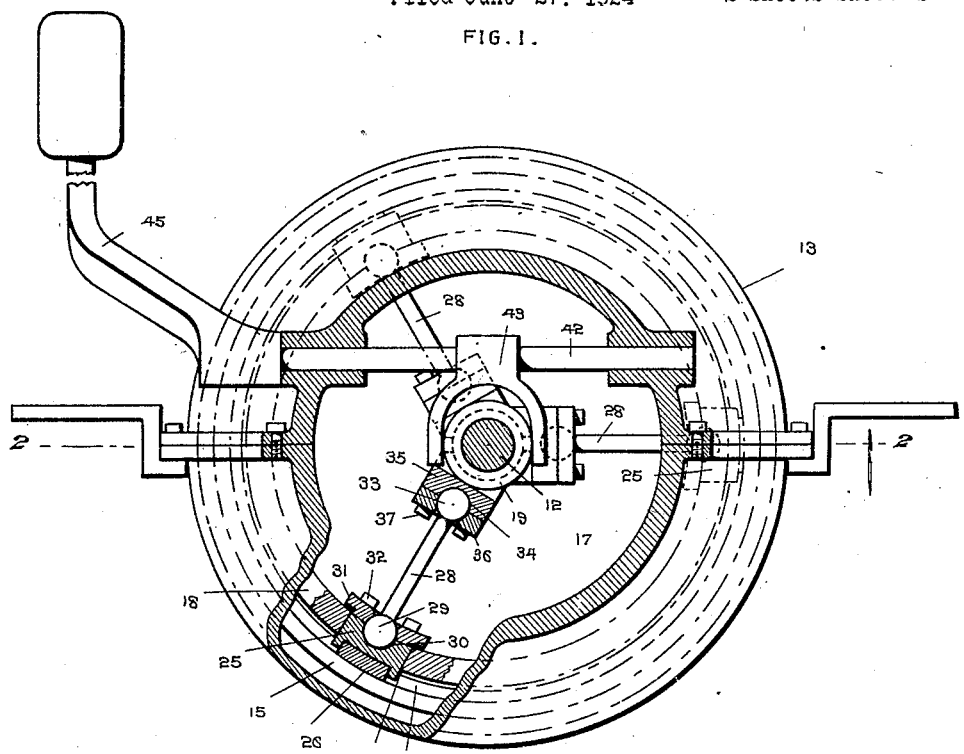
Figure 1 is an elevation of a clutch containing the improvements and intended particularly for use on an automobile or motor vehicle, portions being shown in section on the line 1—1 of Fig. 2.
Figure 2:
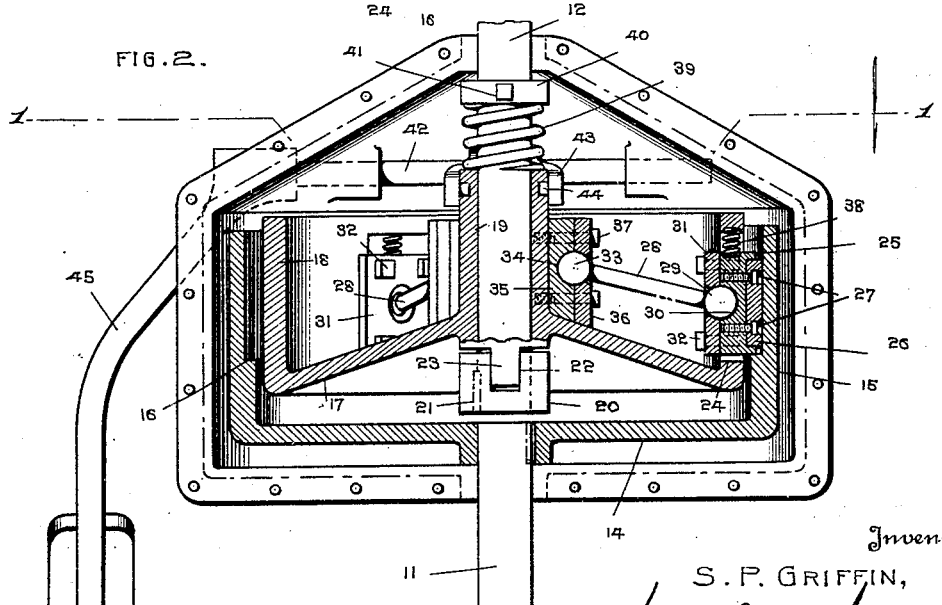
Fig. 2 is a horizontal section on the line 2—2 of Fig. 1, with the supporting brackets or hangers removed.

Reference being had to Figs. 1 and 2, the driving shaft 11 and driven shaft 12 are in alinement, and their adjacent ends enter a casing 13 which houses the clutch, and which can contain lubricant for keeping the parts lubricated. One member of the clutch comprises a disk 14 secured on the terminal of the shaft 11 within the casing 13 and having a rim 15 surrounding the shaft 12, said rim being formed at its inner periphery with a shoulder 16. The other or companion clutch member comprises a disk 17, which is conical as shown, and which has a rim 18 extending in the same direction as the rim 15 and located within and spaced from said rim 15. The disk or clutch member 17 has a hub or sleeve 19 slidably mounted on the shaft 12.

The disk 17 is made to rotate with the shaft 12 by the provision of a collar 20 secured on the terminal of the shaft 12 between the disks 14 and 17, by means of a key 21, so that said collar turns with the shaft 12. The collar 20 and adjacent end of the hub 19 have a sliding connection so that they rotate one with the other. Thus, the collar 20 has longitudinal open slots 22 receiving lugs 23 projecting from the corresponding end of the hub 19, which permits the disk 17 to slide axially. By this arrangement, a strong connection between the disk 17 and shaft 12 is provided, without using a feather or spline between the hub 19 and shaft 12.

The rim 18 is provided with openings 24 (three as shown) in which clutch shoes 25 are slidable parallel with the axis of the shafts 11 and 12, and said shoes have soles 26 of suitable friction material secured thereto to bear against the inner cylindrical periphery of the rim 15. The soles 26 are secured to the shoes 25 by screws 27, whereby the soles or wear pieces can be replaced when worn out.

A toggle device is provided between the shoes 25 and hub 19, including the toggle links 28 which have ball and socket connections with the shoes and hub. Thus, the links 28 have balls 29 at their outer ends seated in recesses 30 in the shoes 25, and retainer plates 31 are secured to the backs of the shoes 25, by means of screws 32, or the like, and have openings receiving the balls 29 for holding said balls in the recesses 30. The links 28 have the balls 33 at their inner ends seated in recesses 34 in plates 35 bearing against the hub 19, and retainer plates 36 bear against the plates 35 and have openings receiving the balls 33 for holding them in the recesses 34. The plates 35 and 36 are secured together and to the hub 19 by means of screws or bolts 37. The retainer plates 31 overlap the inner periphery of the rim 18, but are normally spaced from said rim, and will, by contact with the rim, limit the outward movement of the shoes in the openings 24, this being of particular advantage when the clutch is opened.

Coiled springs 38 are confined between the shoes 25 and those ends of the openings 24 opposite to the disks 14 and 17, whereby the springs 38 have a tendency to move the shoes 25 in the openings 24 toward the disks, whereby the shoes are moved inwardly away from the rim 15 by the swinging movement of the toggle links 28 which are anchored to the hub 19.

A coiled spring 39 surrounds the shaft 12 and is confined between the hub 19 and a collar 40 secured by a set screw 41 or otherwise on the shaft 12, whereby the expansion of the spring 39 will slide the hub 19 and disk 17 toward the disk 14 to bring the shoes 25 against the shoulder 16. This urging of the disk 17 toward the disk 14 by the spring 39, will automatically close the clutch. Thus, the shoes 25 are brought against the shoulder 16, which will stop the movement of the shoes toward the disk 14, and the disk 17 being moved further on by the spring 39, will move the inner ends of the toggle links 28 toward the plane of the outer ends of the toggle links, thereby tending to straighten out the toggle devices, so that the shoes 25 are forced outwardly against the rim 15 under considerable pressure. The shoes thus contact with the rim 15 with such pressure that the clutch members and shafts rotate one with the other. When the spring 39 moves the disk 17 further than the shoes 25, the springs 38 are compressed, but the spring 39 is stronger than the aggregate strength of the springs 38.

In order to open the clutch, the sleeve 19 and disk 17 are retracted from the disk 14, thereby compressing the spring 39. When the disk 17 starts to move away from the disk 14, the inner ends of the toggle links are moved likewise, and the shoes 25 are held against the shoulder 16 by the springs 38 until the shoes come into contact with the ends of the openings 24 nearest to the disk 14. In this way, the inner and outer ends of the toggle links are separated longitudinally of the axis of the clutch, and this will, by the swinging movement of the toggle links, retract the shoes 25 from the rim 15, so as to open the clutch. When the disk 17 is retracted to move the corresponding ends of the openings 24 beyond the shoulder 16, the shoes 25 are removed from said shoulder, as well as being spaced from the inner periphery of the rim 15.

As shown, the means for retracting the clutch member or disk 17 comprises a rock shaft 42 journaled in the casing 13 and having a fork 43 engaging an annular groove 44 in the hub 19, a pedal 45 being secured to the rock shaft at the exterior of the casing for opening the clutch by foot pressure although other actuating means can be used.

The clutch shown in Figs. 1 and 2 is intended especially for use on automobiles and other motor vehicles, although it can be used for other purposes.

Figure 3:
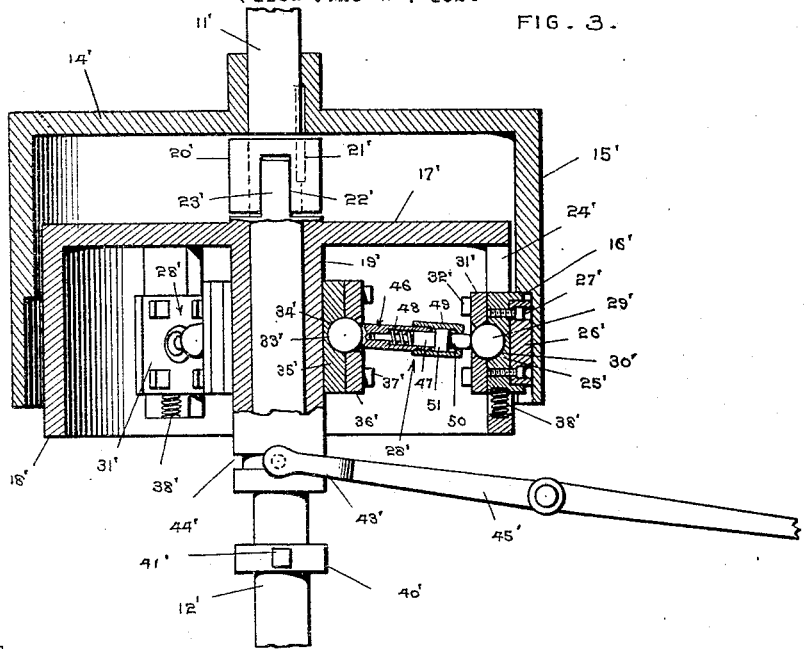
Fig. 3 is a diametrical section of another form of clutch containing the improvements, portions being shown in elevation, and the clutch being in closed position.
Figure 4:
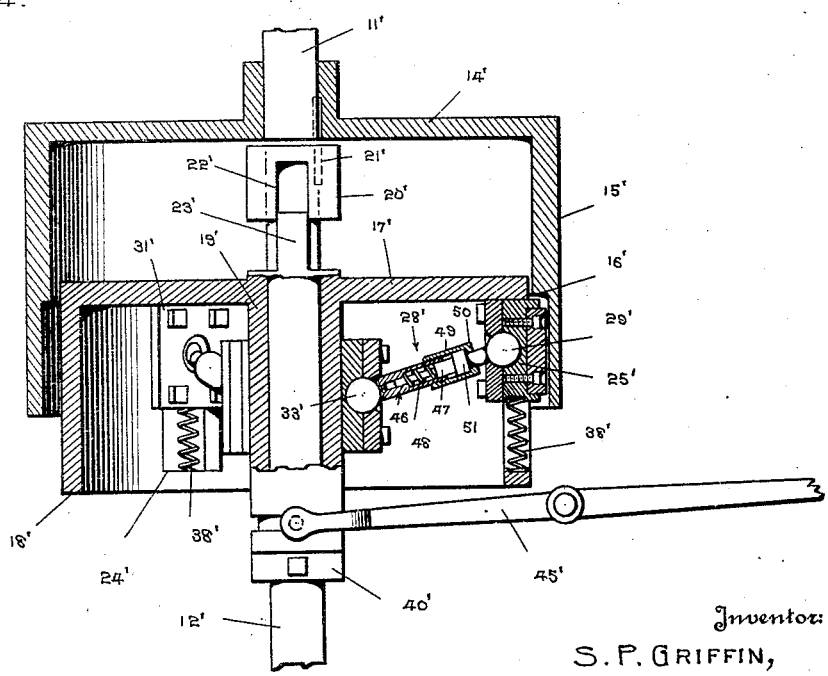
Fig. 4 is a view similar to Fig. 3 with the clutch in open position.

Figs. 3 and 4 show a clutch for general use in shops, machines, and the like. The second form of clutch also contains additional improvements whereby the clutch will remain open or closed.

The clutch member or disk 14' is secured on the shaft 11' and has the rim 15' provided with the shoulder 16', and the clutch member or disk 17' has a rim 18' extending in the same direction as the rim 15' and located therein and being spaced therefrom. The hub 19' is loose on the shaft 12' for longitudinal sliding movement and is slidably connected with the shaft 12' by the collar 20' fastened by the key 21' on the end of the shaft 12', said collar having the slots 22' receiving the lugs or tongues 23' projecting from the end of the sleeve or hub 19'. The rim 18' has openings 24' in which shoes 25' are movable, and the soles 26' are secured to the shoes by the screws 27'.

Toggle links 28' are provided between the shoes and hub, and have the balls 29' at the outer ends seating in the recesses 30' of the shoes and held therein by the retainer plates 31' secured to the shoes by the screws 32'. The retainer plates 31' provide stops to contact with the rim 18' to limit the outward movement of the shoes in the openings 24'. The balls 33' at the inner ends of the toggle links are seated in recesses 34' of plates 35' and retainer plates 36' surround the balls 33' and hold them in the recesses, screws or bolts 37' securing the plates 35' and 36' to one another and to the hub 19'. Springs 38' are confined between the shoes 25' and those ends of the openings 24' opposite to the disks 14' and 17'.

The toggle links 28' are constructed to be compressed yieldingly lengthwise and to have limited longitudinal expansion. Thus, each link comprises the tubular section 46 and the section 47 extending slidably therein for the longitudinal contraction and expansion of the link. A coiled spring 48 is confined in the section 46 between the sections 46 and 47, to expand the link, and the expansion of the link is limited. Thus, a sleeve 49 is screw-threaded or otherwise secured on the section 46 and has an inturned flange 50 to contact with a collar or shoulder 51 on the section 47, when the sections 46 and 47 are moved away from one another the predetermined limit.

The disk 17' is moved toward and away from the disk 14' by suitable means. As shown, a lever 45' is provided having a fork 43' engaging the annular groove 44' in the hub 19', and the movement of the disk 17' away from the disk 14' is limited by a collar 40' secured on the shaft 12' by a set screw 41' or the like.

When the disk 17' is moved toward the disk 14', as seen in Fig. 3, the shoes 25' contact with the shoulder 16' and are stopped in their movement toward the disk 14', while the disk 17' is moved further on. The springs 38' are therefore compressed, and the inner ends of the toggle links are moved to and slightly beyond the plane of the outer ends of the links, thereby moving the toggle devices beyond " dead center ". As a result, the toggle links are compressed longitudinally against the tension of the springs 48, and the tendency for the links to expand will shove the shoes 25' outwardly with considerable pressure against the rim 15'. Furthermore, the inner ends of the toggle links being moved nearer to the disks than the outer ends of the links, will lock the clutch in closed position, inasmuch as the expansive action of the toggle links will have a tendency to move the disk 17' toward the disk 14'.

In order to open the clutch, the disk 17' is forcibly moved away from the disk 14', and the inner ends of the toggle links being moved into and past the plane of the outer ends of the links, will compress the links slightly, and then, as the inner ends of the links move away from said plane, as seen in Fig. 4, the links expand and assist in the movement of the disk 17' away from the disk 14', as well as holding the disks separated. The springs 38' hold the shoes 25' against the shoulder 16' until the shoes are moved with the disk 17' away from said shoulders, as seen in Fig. 4. As the links expand, by the expansion of the springs 48, the flanges 50 and collars 51 will come into contact, thereby limiting the expansion of the links, and when the links are swung the full amount by the complete separation of the disks 14' and 17', as seen in Fig. 4, the swinging movements of the links will retract the shoes 25' from the rim 15', thereby spacing the shoes from the rim 15' and shoulder 16' thereof, to open the clutch. The links expanding will have a tendency to move the disk 17' away from the disk 14' against the stop collar 40', so that the clutch will remain open.

The toggle links 28' can also be used in the clutch shown in Figs. 1 and 2, by eliminating the spring 39, and using the pedal or lever 45 for opening and closing the clutch.

Having thus described the invention, what is claimed as new is:—

1. A clutch comprising a clutch member having a rim, a shaft, a second clutch member having a hub mounted loosely on said shaft, the second clutch member having a rim, shoes movable in the lastnamed rim to contact with the firstnamed rim, toggle links connecting said shoes and second clutch member for thrusting the shoes against the firstnamed rim when the secondnamed clutch member is slid on said shaft, and a collar secured on said shaft, said collar and hub having a sliding connection for turning the second clutch member and shaft one with the other.

2. A clutch comprising alining shafts, a disk secured on one shaft and having a rim, a second disk having a hub mounted loosely on the other shaft and having a rim within the firstnamed rim, shoes movable in the secondnamed rim to contact with the firstnamed rim, toggle links connecting said shoes and hub for thrusting the shoes against the firstnamed rim when the secondnamed disk is slid on the secondnamed shaft, and a collar secured on the secondnamed shaft between the disks, said collar and hub having portions slidably engaging one another so that the hub and secondnamed shaft turn one with the other.

In testimony whereof I hereunto affix my signature.

SAMUEL P. GRIFFIN.